Figure 1:
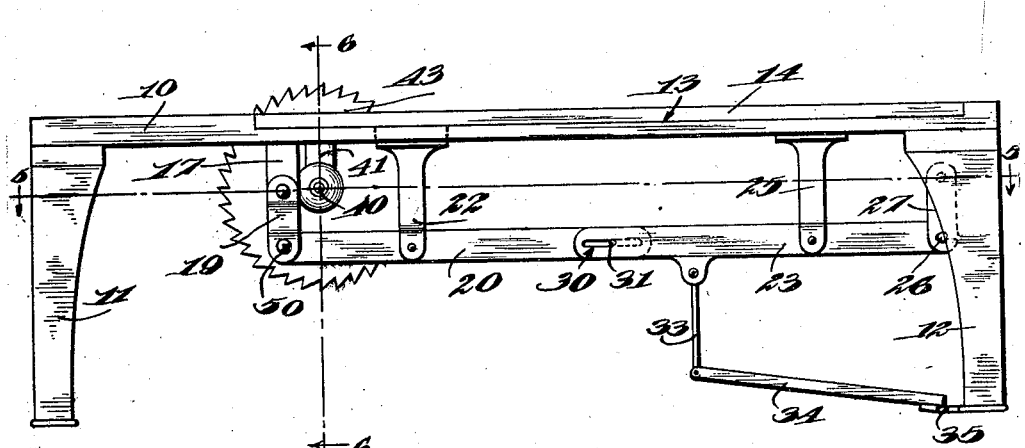

Nov. 12, 1929.                    W. P. McILVANIE                    1,735,773
                                     SAW TABLE
                               Filed Jan. 10, 1929        2 Sheets-Sheet 1

INVENTOR
W. P. McIlvanie,
BY
ATTORNEY

Patented Nov. 12, 1929

1,735,773

UNITED STATES PATENT OFFICE

WILLIAM P. McILVANIE, OF YAKIMA, WASHINGTON

SAW TABLE

Application filed January 10, 1929. Serial No. 331,512.

This invention relates to saw tables, and is more particularly directed to a gauge mechanism adapted to be employed in connection with a saw table.

An object of the invention is the provision of a saw table having a removable top provided with a plurality of slots through which are adapted to be projected gauge bars located at predetermined distances from each other and from a circular saw which is adapted to cut boards lengthwise, the width of the cut being determined by the gauge bars.

A further object of the invention is the provision of a removable top for a saw table having a plurality of slots extending lengthwise of the top through which are adapted to be projected gauge bars, and against which are placed in abutting relation a board adapted to be cut lengthwise in predetermined widths by a circular saw disposed relative to the gauge bars, the removable top carrying as a unit a plurality of operating means in the form of alined levers having their inner ends pivotally connected together with the inner ends movable downwardly or outwardly from the under face of the table top for causing the gauge bars to be projected through the slots.

This invention will be best understood from a consideration of the following detailed description in connection with the acompanying drawings; everthelss, it is to be uderstood that the invention is not confined to the disclosure being susceptible of such changes and modifications as shall define no material departure from the salient features of the invention as expressed in the appended claims.

In the drawings:—

Figure 2:
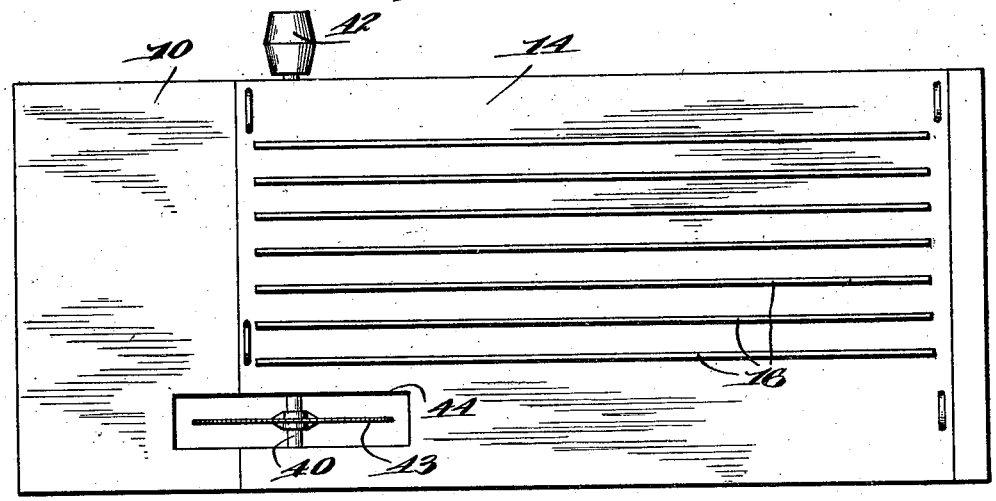
Figure 3:
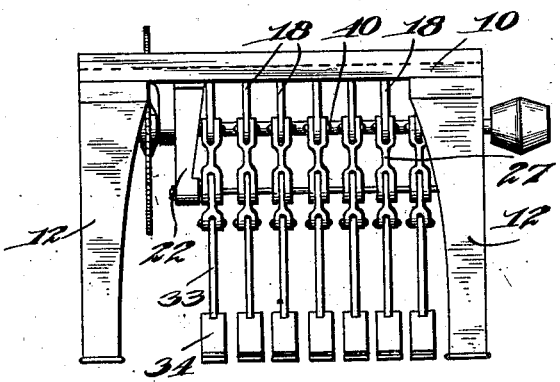
Figure 4:
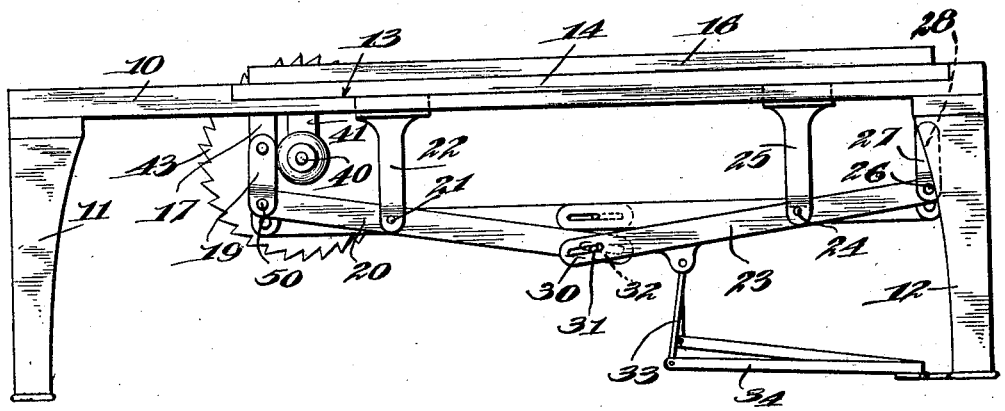
Figure 5:
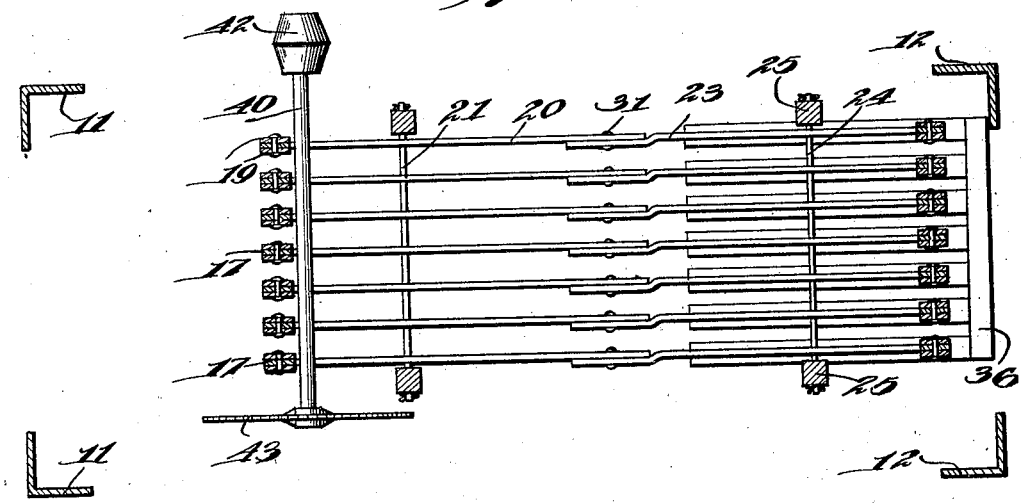
Figure 6:
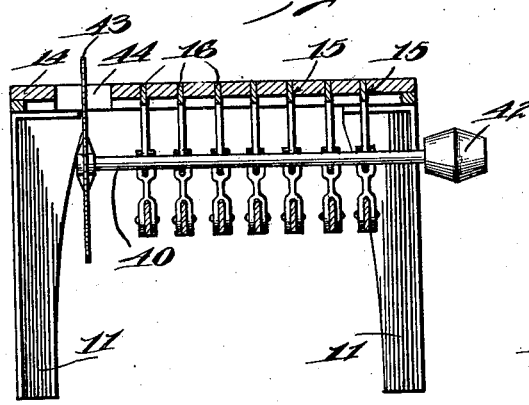

Figure 1 is a side view in elevation of a saw table constructed in accordance with the principles of my invention, Figure 2 is a plan view of the saw table, Figure 3 is a front end view, Figure 4 is a side view in elevation of the saw table showing the actuating mechanism for one of the gauge bars in an operative position, Figure 5 is a horizontal section taken along the line 5—5 of Fig. 1, Fig. 6 is a transverse vertical section taken along the line 6—6 of Fig. 1.

Referring more particularly to the drawings, 10 designates a table top supported by legs 11 and 12 at the opposite ends thereof. The top 10 is cut away to provide a recess 13 in which is removably mounted an auxiliary table top 14. As will be presently explained this auxiliary top is removable as a unit with the operating mechanism for a plurality of gauge bars. This unitary construction provides for the application of the auxiliary table top, the gauge bars, and the operating mechanism for the bars to a table of ordinary construction, by forming an opening of suitable length and width in the main table top for the reception of the operating mechanism for the gauge bars and for supporting the auxiliary top on the main top. The auxiliary top 14 is provided with a plurality of slots 15 extending longitudinally of the top 14 and in a predetermined spaced relation.

Located within each slot is a gauge bar 16 which is adapted to be projected upwardly through the slot and above the surface of the auxiliary top 14. A lug 17 projects from the rear end of each gauge bar, while a lug 18 projects from the front end of a bar. A link 19 connects the lower end of the lug 17 with one end of a lever 20 pivoted at 21 to a depending bracket 22. A lever 23 is pivotally connected at 24 to a depending bracket 25 and has its outer end pivotally connected at 26 to a link 27. The link 27 is pivotally connected at 28 to a depending lug 18. Each lever 23 is provided with a slot 30 adapted to receive a pin 31. The inner end of each lever 20 is provided with a slot 32 adapted to receive said pin so that the inner ends of the levers are not only pivotally connected together, and have a sliding relation with each other, but when the end of one lever is moved downwardly or upwardly, the inner end of the other lever has a reciprocal motion.

A link 33 connects the inner end of the lever 23 with a treadle 34. Each treadle has a hinge connnection as 35 with a bar 36 which extends transversely of the table and adjacent the feet of the forward legs 12.

A shaft 40 is mounted in bearings formed in brackets 41 depending from the under face of the main table top 10. A pulley 42 is rigid with the shaft 40 and is adapted to be driven in any manner from a suitable source of power. A circular saw 43 is rigid with one end of the shaft 40 and projects through a slot 44 in the auxiliary top 14, and is spaced from a gauge bar 16.

The operation of my device is as follows: The levers 20 and 23 are normally in a horizontal plane and in alinement with each other so that the gauge bars 16 will be normally located within the slots and with their outer edges flush with the surface of the auxiliary top 14. Each of the gauge bars are provided with indicia whereby it is possible to readily determine which bar it is necessary to project above the top 14 in order to provide for the proper width of the longitudinal cut of the board. After the selection of the gauge bar has been determined, the proper pedal 34 is depressed, moving the inner ends of the associated bars or levers 20 and 23, while elevating the outer ends and thus causing the gauge bar to be projected upwardly through the slot and above the table top 14. The board is then placed with one side edge in contact with the gauge bar and moved forwardly towards the circular saw 43 for cutting off a portion of the board. The weights of the lever, together with the treadle, and the operating parts connected therewith, are sufficient to cause the gauge bar to remain in depressed position. If at any time it be found that certain of the gauge bars are projected above the top of the table, it is only necessary to lay the board which is about to be cut on said gauge bar whereby they will be depressed.

When it is desired to apply the unit to a work table of well known construction, it is only necessary to cut an opening in the top 10 of sufficient length and width to receive the operating parts of the gauge bars, when the auxiliary top 14 is placed in position. In such a case, the table top 14 is formed as a unit with the brackets 22, the levers 20 and 23, and the treadle 34, and the parts connecting the various elements together. The shaft 14 may be applied to the brackets 41 after the auxiliary top and the operating mechanism for the gauge bars have been placed in position, or the pivotal connections 50 of the links 19 which may be bolts, having nuts threaded thereon, may be removed before the application of the top 14 to the main top 10.

I claim:—

1. A saw table comprising a main table top, an auxiliary top mounted on the main top and having a plurality of slots extending lengthwise of the auxiliary top, a gauge bar located within each slot, a lug projecting downwardly from each end of a bar, a pair of levers pivoted intermediate the ends thereof, and disposed adjacent each bar, the inner ends of the levers being alined and pivotally connected together, a link connecting the outer end of each lever with a depending lug, means connected with a lever adjacent the inner end thereof adapted to be actuated for moving the inner pivoted ends of said levers downwardly while elevating the outer ends of said levers and likewise the gauge bar above the top of the table.

2. A saw table comprising a main table top, an auxiliary top mounted on the main top and having a plurality of slots extending lengthwise of the auxiliary top, a gauge bar located within each slot, a lug projecting downwardly from each end of a bar, a pair of levers pivoted intermediate the ends thereof, and disposed adjacent each bar, the inner ends of the levers being alined and pivotally connected together, a link connecting the outer end of each lever with a depending lug, means connected with a lever adjacent the inner end thereof adapted to be actuated for moving the inner pivoted ends of said levers downwardly while elevating the outer ends of said levers and likewise the gauge bar above the top of the table, said auxiliary top, the gauge bars, actuating levers and treadles being removable as a unit from the main top.

3. A saw table comprising a top having a plurality of slots extending lengthwise of the top, a gauge bar located within each slot, a lug projecting downwardly from each end of a bar, a pair of levers pivoted intermediate the ends thereof and disposed adjacent each bar, the inner ends of the levers being alined and pivotally connected together, a link connecting the outer end of each lever with a depending lug, a plurality of treadles, a link pivoted to each treadle and connected with a lever adjacent the inner end thereof, said treadles adapted to be actuated for moving the inner pivoted ends of said levers downwardly while elevating the outer ends of said levers and likewise the gauge bar above the top of the table.

WILLIAM P. McILVANIE.